United States Patent [19]

Kissell et al.

[11] 3,886,292

[45] May 27, 1975

[54] PROCESS FOR REDUCING SHORTENING WHILE MAINTAINING QUALITY CAKES

[75] Inventors: Leo T. Kissell, Wooster, Ohio; Max M. Hanamoto, Lafayette, Calif.; Charles L. Mehltretter, Peoria, Ill.

[73] Assignee: The United States of America as represented by the Secretary of Agriculture, Washington, D.C.

[22] Filed: Feb. 15, 1974

[21] Appl. No.: 443,072

[52] U.S. Cl. ................................................ 46/553
[51] Int. Cl. ............................................ A21d 13/08
[58] Field of Search .......... 426/153, 152, 155, 156, 426/343

[56] References Cited
UNITED STATES PATENTS 2,886,438  5/1959  Barsky et al. ...................... 426/152
3,625,706  12/1971  Myhre et al. ...................... 426/152

Primary Examiner—Raymond N. Jones
Attorney, Agent, or Firm—M. Howard Silverstein; Max D. Hensley; William Takacs

[57] ABSTRACT

Chemically-leavened baked goods are prepared with a reduced content of shortening. Baking quality is retained, however, by incorporation of certain additives into the fat system of the batter prior to baking. The additives are fatty acid esters of polyoxyethylene or polyoxyethylene-polyoxypropylene ethers of either propylene glycol glycosides or glycerol glycosides.

8 Claims, No Drawings

PROCESS FOR REDUCING SHORTENING WHILE MAINTAINING QUALITY CAKES

DESCRIPTION OF THE INVENTION

This invention relates to and has among its objects the production of cakes and other related chemically-leavened sweet baked goods, which contain a reduced proportion of shortening but which exhibit the quality of products containing a conventional proportion of shortening. Further objects of the invention will be evident from the following description wherein parts and percentages are by weight unless otherwise specified. The abbreviation "bwf" used herein means based on the weight of flour.

In the following description, emphasis is directed to the production of layer cakes. This is by way of illustration and not limitation. In its broad ambit the invention is applicable to all kinds of cakes of the chemically-leavened type, such as cupcakes, pound cakes, sheet cakes, and the like.

Layer cakes and other chemically-leavened sweet baked goods are popular dessert items. Unfortunately they contain a high proportion of fat which is necessary for good baking performance, especially texture and volume. For example, in the conventional preparation of layer cakes, about 50% (based on the weight of flour) of shortening containing about 6% of mono- and di-glyceride emulsifier is used in the batter, and this amount of shortening is essential to obtain good quality as to texture, volume, and shape of the loaf. However, such high level of shortening is undesirable because of its high caloric value. Thus, cakes usually are avoided by persons who must control their caloric intake.

The invention described herein provides means for obviating the problem outlined above. In accordance with the invention, certain additives are incorporated into the batter prior to baking, whereby to yield cakes of excellent quality although the proportion of shortening is substantially lower than in conventional practice.

The additives used in accordance with the invention fall into four categories, as follows:

a. Fatty acid esters of polyoxyethylene ethers of glycerol glycosides.

b. Fatty acid esters of polyoxyethylene-polyoxypropylene ethers of glycerol glycosides.

c. Fatty acid esters of polyoxyethylene ethers of propylene glycol glycosides.

d. Fatty acid esters of polyoxyethylene-polyoxypropylene ethers of propylene glycol glycosides.

In the additives of the invention, the fatty acids contain 12 to 18 carbon atoms, and examples thereof include lauric, myristic, palmitic, stearic, palmitoleic, and oleic acids. It is critical for the purpose of the invention that the proportion of combined fatty acid be limited to 1 to 2 moles thereof per mole of glycoside. Also critical for the purpose of the invention is that the polyoxyalkylene portion of the compounds be limited to 5 to 20 moles of combined alkylene oxide (ethylene oxide alone or ethylene oxide plus propylene oxide) per mole of glycoside.

The glycoside portion of the additives may be derived from any of the sugars such as glucose, fructose, sucrose, maltose, lactose, inverted sucrose, or from starch. Particularly preferred for the purpose of the invention are the compounds derived from starch or lactose--for example, fatty acid esters of polyoxyethylene ethers of glycerol starch glycoside, fatty acid esters of polyoxyethylene ethers of propylene glycol starch glycoside, fatty acid esters of polyoxyethylene ethers of glycerol lactose glycoside, and fatty acid esters of polyoxyethylene ethers of propylene glycol lactose glycoside.

The additives used in accordance with the invention can be prepared by known procedures, for example, those described by Otey, Mehltretter, and Rist, Jour. Am. Oil Chem. Soc., Vol. 40, pp. 76–78 and Griffin, U.S. Pat. No. 2,407,003. Neither the additives per se nor their preparation constitute any part of the invention. For the sake of clarifying the nature of the additives, however, a brief description of their synthesis is set forth below, wherein glycerol derivatives are referred to for purpose of illustration. It will be understood that the propylene glycol derivatives are prepared in similar manner.

In a first step of the synthesis glycerol is reacted with a sugar such as glucose, fructose, galactose, inverted sucrose, lactose, xylose, or the like. Lactose is a preferred sugar for preparing the additives used in accordance with the invention. In general, the glycerol and sugar are combined in approximately mole-to-mole ratio, but an excess of glycerol is usually preferred. A small amount of an added catalyst is added and the reactants are heated to a temperature of 100°–140° C. This temperature is maintained until equilibrium is attained, a state generally reached in from 10 to 120 minutes. The resulting product is a glycerol glycoside. For example, where glucose is used as the sugar the product is glycerol glucoside. Where the sugar is lactose, the acid conditions of the reaction cause a hydrolysis so that the product is a mixture of glycerol glucoside and glycerol galactoside, this mixture being termed herein a glycerol lactose glycoside. For synthesizing another preferred type of additive for use in accordance with the invention, starch is used in place of a sugar. Under the influence of the acidic conditions of the reaction, the starch is degraded and the resulting degradation products, including glucose and oligomers of glucose, react with the glycerol. The resulting glycerol-starch glycoside is a mixture of glycerol glucoside together with other glycerol glycosides wherein the glycoside moieties are oligosaccharide radicals containing several combined glucose units.

In a next step the so-formed glycerol glycoside is converted to a polyoxyethylene ether or to a polyoxyethylene-polyoxypropylene ether. In this aspect of the preparation, the glycerol glycoside is reacted with ethylene oxide or with a mixture of ethylene and propylene oxides, at a temperature preferably in the range of 120°–140° C. Compounds suitable as intermediates for the additives of the invention involve preferably reaction of one mole of glycerol glycoside with from 5 to 20 moles of alkylene oxide. In this respect, care must be exercised in that production of polyoxyalkylene ethers with less than 5 moles or more than 20 moles of alkylene oxide per mole of glycoside will yield final compounds that are not effective in avoiding impairment of baking performance of batters containing reduced fat content. In the event that the oxyalkylation is performed with a mixture of ethylene and propylene oxides, it is preferred that the product contain twice as many ethylene oxide as propylene oxide units. Particularly preferred are the compounds wherein the polyalkylene moiety contains on the average 8 moles of ethylene oxide and 3.8 moles of propylene oxide units.

The final step is the production of the fatty acid ester of the so-prepared polyoxyalkylene ether. Fatty acids that can be used in this step include lauric, myristic, palmitic, stearic, palmitoleic, and oleic acids. In general, either saturated or unsaturated long-chain fatty acids may be employed. The acid is reacted with the intermediate in a ratio of 1–2 moles of acid per mole of glycoside. The reaction is generally carried out at temperatures from 180° to 200° C.

The advantages of the present invention are secured by incorporating any of the above-described additives into the fat phase of the cake batter prior to batter mixing and baking. The amount of additive can be varied from about 1 to 4 parts thereof per 100 parts of shortening. A preferred amount is about 2 parts per 100 parts of shortening. Under these circumstances only 25 to 35% (bwf) of fat (shortening) is required to attain cake volumes and grain scores equivalent to those obtained with 50% (bwf) of conventional fat containing ca. 6% mono- and di-glycerides. Other than the instant additives, the cake batter will contain the usual ingredients for preparing cakes as well-known in the art. Basic ingredients are flour, shortening (fat or oil), baking powder, sugar, and water (or milk). Other ingredients which may be added are milk solids, eggs (whole, yolks, or whites), salt, flavorings, etc. Thus, any suitable recipe for cakes may be utilized in the process of the invention, and it is the intention to cover a wide variety of chemically-leavened sweet baked goods. The procedures used in preparing the baked articles in accordance with the invention include the usual operations well-known in the art, for example, creaming, mixing, dispensing into suitable pans, and baking.

It is important to note that the advantages of the invention are unexpected in view of the properties of emulsifiers commonly used in the baking art. When known emulsifiers are incorporated into a cake batter, the amount of shortening cannot be reduced because a product of inferior quality will be attained. Only the additives of the invention enable one to produce high-quality cakes containing a reduced proportion of shortening. As a matter of fact, when using the additives of the invention the shortening content must be decreased; if the normal level of 50% bwf of shortening is used, the cake volume will be decreased.

It is also important to note that although a reduced amount of shortening is used in a practice of the invention, no impairment of cake texture occurs. Thus a further unexpected advantage of the invention is that the additives in question enable the production of cakes of excellent texture even though the amount of shortening is reduced.

EXAMPLES

The invention is further demonstrated by the following illustrative examples.

In these experiments a standard white layer cake recipe was used as the base with variation as to the amount of shortening and the nature of the additives. The recipe used was as follows.

| Ingredient | Weight, g. | Proportion, % bwf |
| --- | --- | --- |
| Cake flour | 200 | 100 |
| Sugar (baker's special) | 280 | 140 |
| Dry milk solids | 24 | 12 |
| Dry egg albumen | 18 | 9 |
| Baking powder | 13 | 6.5 |
| Salt | 6 | 3 |
| Water | 270 | 135 |
| Vanilla extract | 5 | 2.5 |
| Shortening (triglyceride) | Variable—35, 30, and 25% bwf | |
| Additive of invention | 2%, based on weight of shortening | |

The additives tested were as follows:

I–III: The monolaurate, monooleate, and monostearate of a polyoxyethylene ether of glycerol starch glycoside containing an average of 5.2 moles of combined ethylene oxide per mole. In the following tables, these additives are designated as follows:

| I: | PE (5.2) GSG monolaurate |
| II: | " monooleate |
| III: | " monostearate |

IV–VI: The monolaurate, monooleate, and dioleate of a polyoxyethylene ether of glycerol starch glycoside containing an average of 9.6 moles of combined ethylene oxide per mole. In the following tables, these additives are designated as follows:

| IV: | PE (9.6) GSG monolaurate |
| V: | " monooleate |
| VI: | " dioleate |

VII–IX: The monolaurate, monooleate, and dioleate of a polyoxyethylene-polyoxypropylene ether of glycerol starch glycoside containing an average of 8.0 moles of combined ethylene oxide and 3.8 moles of combined propylene oxide per mole. In the following tables, these additives are designated as follows:

| VII: | PE-PP (8.0/3.8) GSG monolaurate |
| VIII: | " monooleate |
| IX: | " dioleate |

X–XII: The monolaurate, monooleate, and distearate of a polyoxyethylene ether of glycerol starch glycoside containing an average of 19.6 moles of combined ethylene oxide per mole. In the following tables, these additives are designated as follows:

| X: | PE (19.6) GSG monolaurate |
| XI: | " monooleate |
| XII: | " distearate |

XIII–XVII: The monostearate and monopalmitate of polyoxyethylene ethers of propylene glycol starch glycoside containing an average of 5.0, 10.1, or 19.9 moles of combined ethylene oxide per mole. In the following tables, these additives are designated as follows:

| XIII: | PE (5.0) PGSG monostearate |
| XIV: | PE (10.1) PGSG " |
| XV: | PE (5.0) PGSG monopalmitate |
| XVI: | PE (10.1) PGSG " |
| XVII: | PE (19.9) PGSG " |

XVIII and XIX: The dipalmitates of polyoxyethylene ethers of glycerol lactose glycoside containing an average of 10 or 5 moles of combined ethylene oxide per mole. In the following tables, these additives are designated as follows:

XVIII: PE (10.0) GL dipalmitate
XIX: PE (5.0) GL     ''

XX and XXI: The dipalmitates of polyoxyethylene ethers of propylene glycol lactose glycoside containing an average of 7.5 or 13.2 moles of combined ethylene oxide per mole. In the following tables, these additives are designated as follows:

XX: PE (7.5) PGL dipalmitate
XXI: PE (13.2) PGL    ''

The shortening used was a commercial triglyceride, free from any emulsifier. The additives were used in the amount of 2%, based on the weight of shortening, and were incorporated into the shortening by creaming prior to preparation of the batter.

Batters were prepared according to standard procedures and scaled into two 8 inch layer pans and baked for 25 minutes at 190° C. After cooling, layer cross-sections were measured for height and radius. Layer volumes were computed from the formula -

$$\text{Volume} = \pi r^2 h$$

wherein $r$ is the radius measured at the midpoint of the side walls and $h$ is the mean of five height measurements across both layers from each batter.

The cakes were also examined and the crumb grain rated on a numerical basis wherein 10 is the maximum score.

For purposes of comparison the following controls were run:

Control A: In this case neither the triglyceride shortening nor the additives of the invention were used. These were replaced by a commercial cake shortening which contained about 6% mono- and di-glycerides as emulsifiers.

Control B: In this case the additives of the invention were not used. The shortening was a commercial triglyceride, free from any emulsifier.

The control cakes were measured for volume and rated for crumb score as previously described.

EXAMPLE 1

In these runs, the proportion of shortening was 35% bwf.

The results are tabulated below:

Table 1

(Shortening — 35% bwf)

| No. | Additive composition | Volume (ml) | Grain score |
|---|---|---|---|
| I | PE (5.2) GSG monolaurate | 1100 | 8.0 |
| II | '' monooleate | 1185 | 8.5 |
| VI | PE (9.6) GSG dioleate | 1128 | 7.5 |
| IX | PE-PP (8.0/3.8) GSG dioleate | 1128 | 9.0 |
| XV | PE (5.0) PGSG monopalmitate | 1125 | 7.0 |
| XVIII | PE (10.0) GL dipalmitate | 1102 | 8.0 |
| Control A | Conventional mono- and di-glycerides | 1058 | 7.0 |
| Control B | None | 942 | 5.0 |

EXAMPLE 2

In these runs, the proportion of shortening was 30% bwf. The results are tabulated below:

Table 2

(Shortening 30% bwf)

| No. | Additive composition | Volume (ml) | Grain score |
|---|---|---|---|
| III | PE (5.2) GSG monostearate | 1125 | 7.5 |
| IV | PE (9.6) GSG monolaurate | 1090 | 8.0 |
| V | '' monooleate | 1108 | 9.0 |
| VII | PE-PP (8.0/3.8) GSG monolaurate | 1095 | 8.5 |
| VIII | PE-PP (8.0/3.8) GSG monooleate | 1102 | 8.0 |
| XI | PE (19.6) GSG monooleate | 1090 | 8.5 |
| XII | '' distearate | 1120 | 9.0 |
| XIII | PE (5.0) PGSG monostearate | 1100 | 8.0 |
| XVI | PE (10.1) PGSG monopalmitate | 1092 | 8.5 |
| XIX | PE (5.0) GL dipalmitate | 1124 | 8.0 |
| XX | PE (7.5) PGL '' | 1156 | 8.0 |
| XXI | PE (13.2) PGL '' | 1100 | 7.5 |
| Control A | Conventional mono- and di-glycerides | 1042 | 6.0 |
| Control B | None | 912 | 4.0 |

EXAMPLE 3

In these runs, the proportion of shortening was 25% bwf. The results are tabulated below:

Table 3

(Shortening 25% bwf)

| No. | Additive composition | Volume (ml) | Grain score |
|---|---|---|---|
| X | PE (19.6) GSG monolaurate | 1110 | 9.0 |
| XIV | PE (10.1) PGSG monostearate | 1110 | 7.5 |
| XVII | PE (19.9) PGSG monopalmitate | 1108 | 7.5 |
| XIX | PE (5.0) GL dipalmitate | 1092 | 9.0 |
| XX | PE (7.5) PGL '' | 1106 | 8.0 |
| Control A | Conventional mono- and di-glycerides | 1005 | 5.5 |
| Control B | None | 882 | 3.5 |

We claim:

1. Chemically-leavened sweet baked goods containing flour and as the sole shortening, a triglyceride free from any emulsifier, in an amount of 25 to 35% by weight of the flour in said baked good and which contains about 1 to 4%, based on the weight of shortening, of an additive which is an ester of a fatty acid containing 12 to 18 carbon atoms with a polyoxyethylene ether of a glycerol glycoside, containing 1 to 2 moles of combined fatty acid per mole thereof, and 5 to 20 moles of combined ethylene oxide per mole thereof.

2. Chemically-leavened sweet baked goods containing flour and as the sole shortening, a triglyceride free from any emulsifier, in an amount of 25 to 35% by weight of the flour in said baked good and which contains about 1 to 4%, based on the weight of shortening, of an additive which is an ester of a fatty acid containing 12 to 18 carbon atoms with a polyoxyethylene-polyoxypropylene ether of a glycerol glycoside, containing 1 to 2 moles of combined fatty acid per mole thereof, and 5 to 20 moles of combined ethylene oxide and propylene oxide per mole thereof.

3. Chemically-leavened sweet baked goods containing flour and as the sole shortening, a triglyceride free from any emulsifier, in an amount of 25 to 35% by weight of the flour in said baked good and which contains about 1 to 4%, based on the weight of shortening, of an additive which is an ester of a fatty acid containing 12 to 18 carbon atoms with a polyoxyethylene ether of a propylene glycol glycoside, containing 1 to 2 moles of combined fatty acid per mole thereof, and 5 to 20 moles of combined ethylene oxide per mole thereof.

4. Chemically-leavened sweet baked goods containing flour and as the sole shortening, a triglyceride free from any emulsifier, in an amount of 25 to 35% by weight of the flour in said baked good and which contains about 1 to 4%, based on the weight of shortening, of an additive which is an ester of a fatty acid containing 12 to 18 carbon atoms with a polyoxyethylene-polyoxypropylene ether of a propylene glycol glycoside, containing 1 to 2 moles of combined fatty acid per mole thereof, and 5 to 20 moles of combined ethylene oxide and propylene oxide per mole thereof.

5. A process for the preparation of chemically-leavened sweet baked goods containing a reduced proportion of shortening but which exhibit the quality of products containing conventional proportions of shortening formulating a batter comprising flour and only 25 to 35% of shortening by weight of the flour so that it would normally yield a baked product of inferior quality, and incorporating into the shortening, prior to preparation of the batter, an additive which is an ester of a fatty acid containing 12 to 18 carbon atoms with a polyoxyethylene ether of a glycerol glycoside, containing 1 to 2 moles of combined fatty acid per mole thereof, and 5 to 20 moles of combined ethylene oxide per mole thereof, said additive being incorporated in an amount of about 1 to 4%, based on the weight of shortening, and baking the said batter.

6. A process for the preparation of chemically-leavened sweet baked goods containing a reduced proportion of shortening but which exhibit the quality of products containing conventional proportions of shortening which comprises formulating a batter comprising flour and only 25 to 35% of shortening by weight of the flour so that it would normally yield a baked product of inferior quality, and incorporating into the shortening, prior to preparation of the batter, an additive which is an ester of a fatty acid containing 12 to 18 carbon atoms with a polyoxyethylene-polyoxypropylene ether of a glycerol glycoside, containing 1 to 2 moles of combined fatty acid per mole thereof, and 5 to 20 moles of combined ethylene oxide and propylene oxide per mole thereof, said additive being incorporated in an amount of about 1 to 4%, based on the weight of shortening, and baking the said batter.

7. A process for the preparation of chemically-leavened sweet baked goods containing a reduced proportion of shortening but which exhibit the quality of products containing conventional proportions of shortening, which comprises formulating a batter comprising flour and only 25 to 35% of shortening by weight of the flour so that it would normally yield a baked product of inferior quality, and incorporating into the shortening, prior to preparation of the batter, an additive which is an ester of a fatty acid containing 12 to 18 carbon atoms with a polyoxyethylene ether of a propylene glycol glycoside, containing 1 to 2 moles of combined fatty acid per mole thereof, and 5 to 20 moles of combined ethylene oxide per mole thereof, said additive being incorporated in an amount of about 1 to 4%, based on the weight of shortening, and baking the said batter.

8. A process for the preparation of chemically-leavened sweet baked goods, containing a reduced proportion of shortening but which exhibit the quality of products containing conventional proportions of shortening which comprises formulating a batter comprising flour and only 25 to 35% of shortening by weight of the flour so that it would normally yield a baked product of inferior quality, and incorporating into the shortening, prior to preparation of the batter, an additive which is an ester of a fatty acid containing 12 to 18 carbon atoms with a polyoxyethylene-polyoxypropylene ether of a propylene glycol glycoside, containing 1 to 2 moles of combined fatty acid per mole thereof, and 5 to 20 moles of combined ethylene oxide and propylene oxide per mole thereof, said additive being incorporated in an amount of about 1 to 4%, based on the weight of shortening, and baking the said batter.

* * * * *